(12) United States Patent
Ko

(10) Patent No.: US 7,051,280 B1
(45) Date of Patent: May 23, 2006

(54) METHOD FOR DISPLAYING RESERVATION GUIDE/CONFIRMATION SCREEN IN A TV

(75) Inventor: Jae Woo Ko, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 09/643,261

(22) Filed: Aug. 22, 2000

(30) Foreign Application Priority Data

Aug. 24, 1999 (KR) ............................... 1999-35167

(51) Int. Cl.
*G06F 9/00* (2006.01)

(52) U.S. Cl. ...................... 715/718; 715/716; 715/717; 715/810; 715/825; 715/865; 715/828

(58) Field of Classification Search ........ 345/716–718, 345/810, 825, 841, 865, 828–831; 725/56, 725/52
See application file for complete search history.

(56) References Cited

U.S. PATENT DOCUMENTS

| | | | | |
|---|---|---|---|---|
| 5,991,832 A | * | 11/1999 | Sato et al. ...................... 710/33 |
| 6,128,009 A | * | 10/2000 | Ohkura et al. ................. 725/46 |
| 6,151,059 A | * | 11/2000 | Schein et al. .................. 725/37 |
| 6,177,931 B1 | * | 1/2001 | Alexander et al. ............. 725/52 |
| 6,185,360 B1 | * | 2/2001 | Inoue et al. ................... 386/46 |
| 6,246,442 B1 | * | 6/2001 | Harada et al. ............... 348/569 |
| 6,369,840 B1 | * | 4/2002 | Barnett et al. ............... 345/853 |
| 6,370,554 B1 | * | 4/2002 | Sun-Woo ..................... 708/112 |
| 6,462,784 B1 | * | 10/2002 | Kohno et al. ................ 348/563 |
| 6,519,009 B1 | * | 2/2003 | Hanaya et al. .............. 348/564 |
| 2002/0194197 A1 | * | 12/2002 | Flank ....................... 707/104.1 |

* cited by examiner

*Primary Examiner*—Kristine Kincaid
*Assistant Examiner*—Peng Ke
(74) *Attorney, Agent, or Firm*—Fleshner & Kim, LLP

(57) ABSTRACT

A method for displaying a reservation guide/confirmation screen in a tv includes the steps of: displaying a reservation guide screen if a user selects a reservation mode, setting the user's desired reservation state using a predetermined key on the reservation guide screen, and displaying a reservation confirmation screen if the user selects a reservation confirmation mode. In the reservation mode, day or date is displayed on a horizontal axis and a user's desired time zone is displayed on a vertical axis in a two-dimensional timetable. Therefore, the user can easily recognize a reservation guide/confirmation screen. Furthermore, since reservation can be set and confirmed on the screen of two-dimensional timetable type using a mouse or key, convenience can be provided to the user.

26 Claims, 7 Drawing Sheets

FIG.3
Prior Art today : 99. 6. 1(monday) | reservation viewing/recording screen

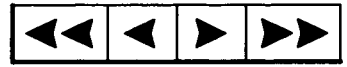

| | channel | title | reservation time |
|---|---|---|---|
| 1 | 13-01 WNET | MASTERPIECE THEATRE (reservation viewing) | 6.1(Mon.) 11:30~13:30 |
| 2 | 14-00 NBCW | WORLD NEWS (reservation viewing) | 6.2(Tue.) 10:00~10:30 |
| 3 | 15-01 HBD | TITANIC (reservation recording) | 6.3(Wed.) 07:00~10:30 |
| 4 | 16-01 CNN | HEADLINE NEWS (reservation viewing) | 6.5(Fri.) 08:00~09:00 |
| 5 | 17-01 WXYZ | THE SIMPSONS (simultaneous selection of reservation viewing and reservation recording) | 6.5(Fri.) 09:10~10:50 |
| 6 | 18-01 MSG | NBA FINALS (reservation viewing) | 6.6(Sat.) 18:00~21:00 |
| 7 | 18-02 TBS | THE MAN WHO SHOT TH (reservation viewing) | 6.7(Sun.) 13:00~14:00 |
| 8 | 19-01 E1 | FLUBBER (reservation recording) | 6.8(Mon.) 11:30~13:30 |

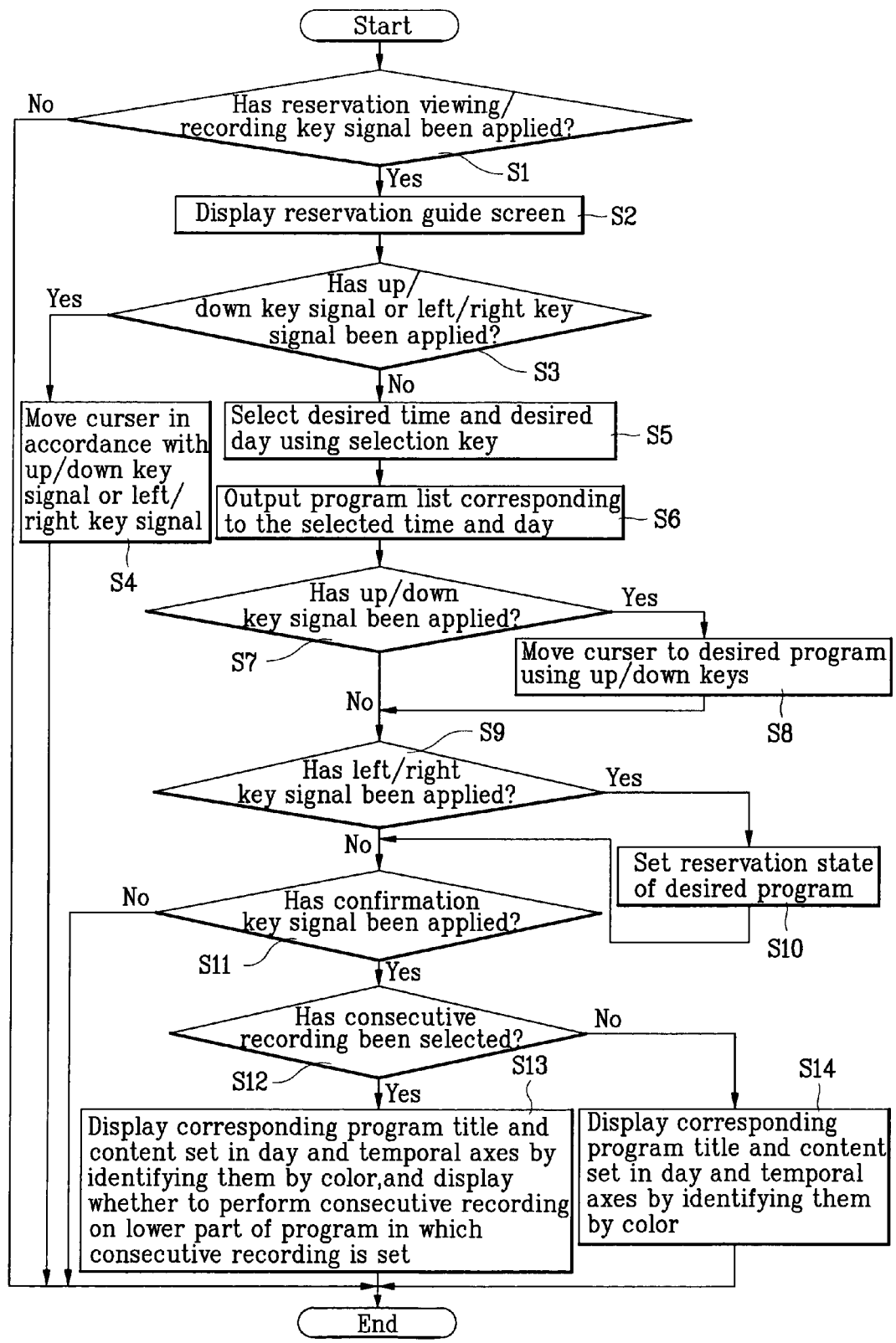

METHOD FOR DISPLAYING RESERVATION GUIDE/CONFIRMATION SCREEN IN A TV

BACKGROUND OF THE INVENTION

1. Field of the Invention

The present invention relates to a TV, and more particularly to a method for displaying a reservation guide/confirmation screen in a tv.

2. Background of the Related Art

Generally, a TV tunes a broadcasting signal transmitted from a broadcasting station in accordance with a user's selection and displays the broadcasting signal on a screen. With development of multimedia technologies, the TV trends to digital mode instead of analog mode. In this respect, standard guidelines of interactive services such as on-line game service and video on demand service are provided, and system makers are actively studying on technologies of interface between users and interactive services.

A tv receiver or Internet TV which is being currently developed provides graphic user interface (GUI) having the same level as a personal computer.

As an example of the GUI, electronic program guide service that acts as a guide information screen for broadcasting programs displays a user's desired programs for respective broadcasting stations on a screen depending on factors such as date and time. This service is one of technical fields which require technology development to enhance users' convenience in response to complexity and variety of digital channels.

A related art tv and a related art method for displaying a reservation guide screen will be described with reference to the accompanying drawings.

FIG. 1 is a block diagram showing a related art tv, FIG. 2 shows a program guide screen of the related art tv, and FIG. 3 shows a reservation confirmation screen of the related art tv.

As shown in FIG. 1, the related art tv includes a tuner 11 for selecting a user's desired broadcasting channel, a demultiplexer 12 for demultiplexing a broadcasting signal selected by the tuner 11, i.e., a temporally multiplexed transport stream, a video signal processor 13 for processing broadcasting information demultiplexed by the demultiplexer 12, a program guide screen generator 14 for receiving program guide information from the demultiplexed broadcasting information and generating an OSD type program guide screen, a switching portion 15 for selectively outputting the output of the video signal processor 13 or the output of the program guide screen generator 14, a display portion 16 for displaying the output of the switching portion 15 on a screen, a memory 17 for storing information generated from the program guide screen generator 14, a key input portion 19 for inputting request command of the user, and a controller 18 for controlling the operation of respective elements of the TV in accordance with the input request command.

The operation of the aforementioned tv will be described.

The transport stream tuned by the tuner 11 is demultiplexed by the demultiplexer 12 and divided into broadcasting information and specific information containing program guide information. The specific information containing program guide information is stored in a corresponding portion of the memory 17 under the control of the controller 18.

Subsequently, the broadcasting information is processed by the video signal processor 13 and displayed on the screen by the display portion 16 through the switching portion 15.

Meanwhile, if the user requests to output the program guide screen by manipulating the key input portion 19, i.e., a remote controller or key of a main body, the controller 18 reads out the program guide screen information stored in the memory 17 and transmits the information to the program guide screen generator 14.

Afterwards, the program guide screen generator 14 processes the program guide screen information transmitted from the controller 18 in OSD so as to display the information through the switching portion 15 and the display portion 16.

If the user desires to set reservation recording/viewing, the user selects the reservation recording/viewing referring to the broadcasting guide information displayed through the display portion 16.

As shown in FIG. 2, the related art program guide screen on which a corresponding program title is arranged using a horizontal direction as a temporal axis and a vertical direction as a channel axis is displayed in OSD.

Meanwhile, if the user desires to set reservation recording/viewing, the user selects a desired channel using the key input portion 16 referring to the program list displayed depending on channel and time, or clicks a cursor of a mouse on a corresponding program title.

To confirm the set reservation recording/viewing, a reservation confirmation mode is selected. Then, as shown in FIG. 3, a reservation confirmation screen is displayed.

As shown in FIG. 3, the reservation confirmation screen for reservation recording or reservation viewing according to the related art TV is one-dimensionally displayed by displaying order of reservation recording/viewing on a vertical axis and a corresponding channel number, a channel name, a program title of a channel and reservation time on a horizontal axis.

As aforementioned, the related art tv and the related art method for displaying a reservation confirmation screen have a problem. That is, since a reservation list cannot be displayed on one screen in the order of channels, the reservation list should be searched one by one to confirm whether a program to be reserved temporally overlaps a reserved program.

SUMMARY OF THE INVENTION

Accordingly, the present invention is directed to a method for displaying a reservation guide/confirmation screen in a tv that substantially obviates one or more of the problems due to limitations and disadvantages of the related art.

An object of the present invention is to provide a method for displaying a reservation guide/confirmation screen in a tv in which a reservation guide screen and a reservation confirmation screen are displayed in a timetable familiar with a user when the user selects reservation viewing or reservation recording, so that the user can easily search for it.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for displaying a reservation guide screen in a tv according to the present invention includes the steps of: displaying a reservation guide screen if a user selects a reservation mode, setting the user's desired reservation state using a predetermined key on the reservation guide screen, and displaying a reservation confirmation screen if the user selects a reservation confirmation mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 shows a reservation confirmation screen of the related art tv;

FIG. 4 is a flow chart showing a method for displaying a reservation guide/reservation confirmation screen in a tv according to the present invention;

DETAILED DESCRIPTION OF THE PREFERRED EMBODIMENTS

Reference will now be made in detail to the preferred embodiments of the present invention, examples of which are illustrated in the accompanying drawings.

A method for displaying a reservation guide/confirmation screen in a tv according to the present invention will be described with reference to FIG. 4.

Referring to FIG. 4, it is determined whether a reservation viewing/recording key signal has been applied (S1). As a result of the determination (S1), if the reservation viewing/recording key signal has been applied, a reservation guide screen is displayed (S2).

It is then determined whether an up/down key signal or a left/right key signal has been applied on the reservation guide screen (S3). As a result, if the up/down key signal or the left/right key signal has been applied, a curser moves in accordance with the up/down key signal or the left/right key signal (S4).

Meanwhile, as a result of the determination (S3), if the up/down key signal or the left/right key signal has not been applied, a desired time and a desired day are selected using a selection key (S5).

Subsequently, a program list corresponding to the selected time and day is output (S6). It is determined whether the up/down key signal has been applied on the output program list (S7).

If the up/down key signal has been applied, the cursor moves to a desired program using up/down keys (S8).

Meanwhile, if the up/down key signal has not been applied, it is determined whether the left/right key signal has been applied (S9). As a result, if the left/right key signal has been applied, a reservation state of the desired program is set (S10). However, if the left/right key signal has not been applied, it is determined whether a confirmation key signal has been applied (S11).

As a result of the determination (S11), if the confirmation key signal has been applied, it is determined whether consecutive recording has been selected (S12).

If the consecutive recording has been selected, a corresponding program title and a content set in day and temporal axes are displayed by identifying them by color, and whether to perform consecutive recording is displayed on a lower part of the program in which consecutive recording is set (S13).

Meanwhile, as a result of the determination (S12), if consecutive recording has not been selected, a corresponding program title and a content set in day and temporal axes are only displayed by identifying them by color (S14).

A preferred embodiment of the aforementioned method for displaying a reservation guide/confirmation screen in a tv according to the present invention will be described with reference to FIGS. 5 to 7.

Figure 1:
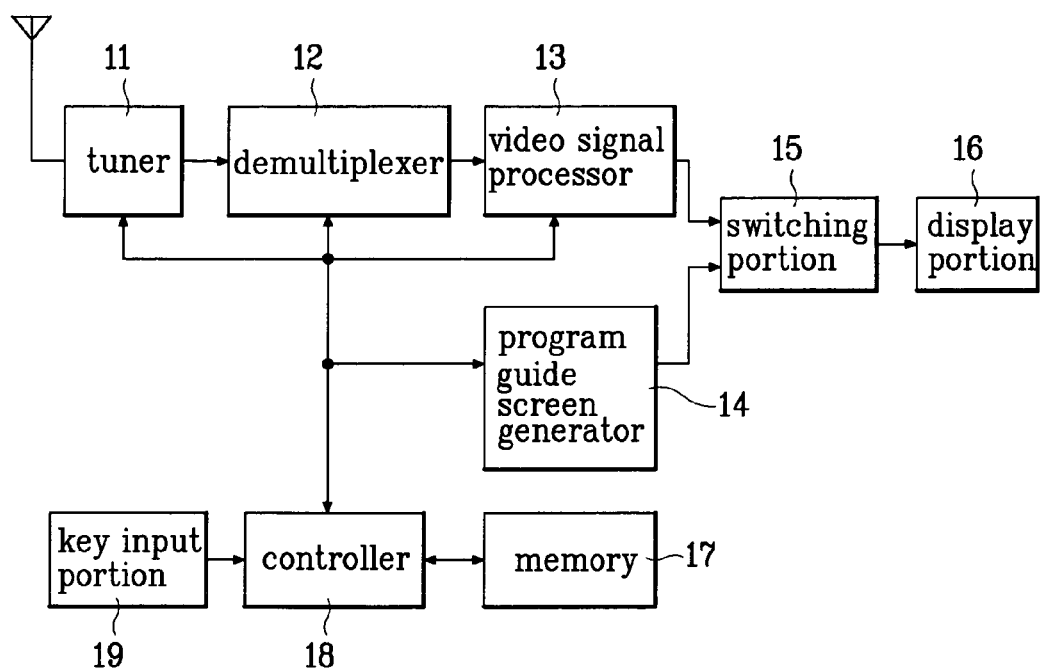
FIG. 1 is a block diagram showing a related art tv.
Figure 2:
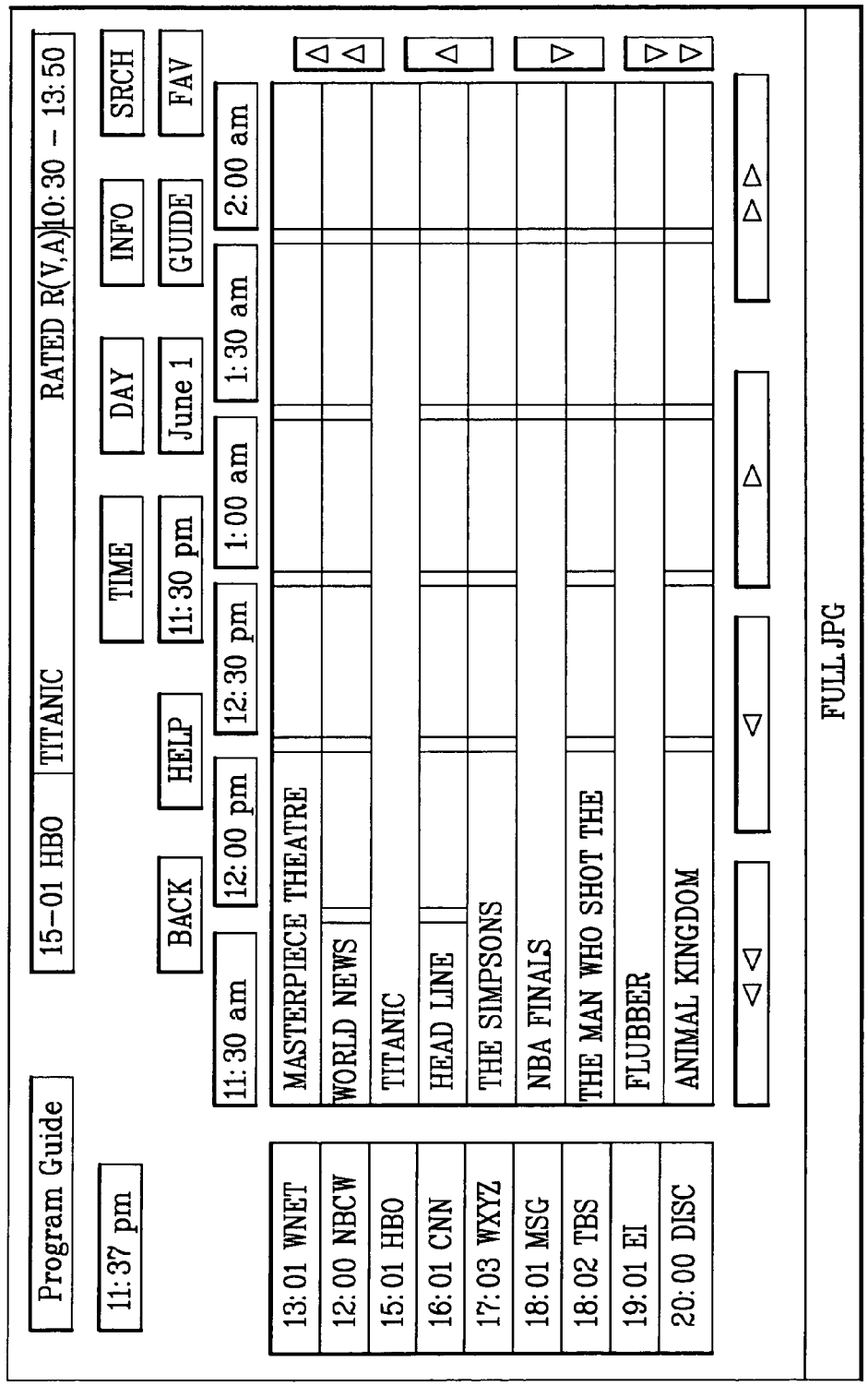
FIG. 2 shows a program guide screen of the related art tv.
Figure 5:
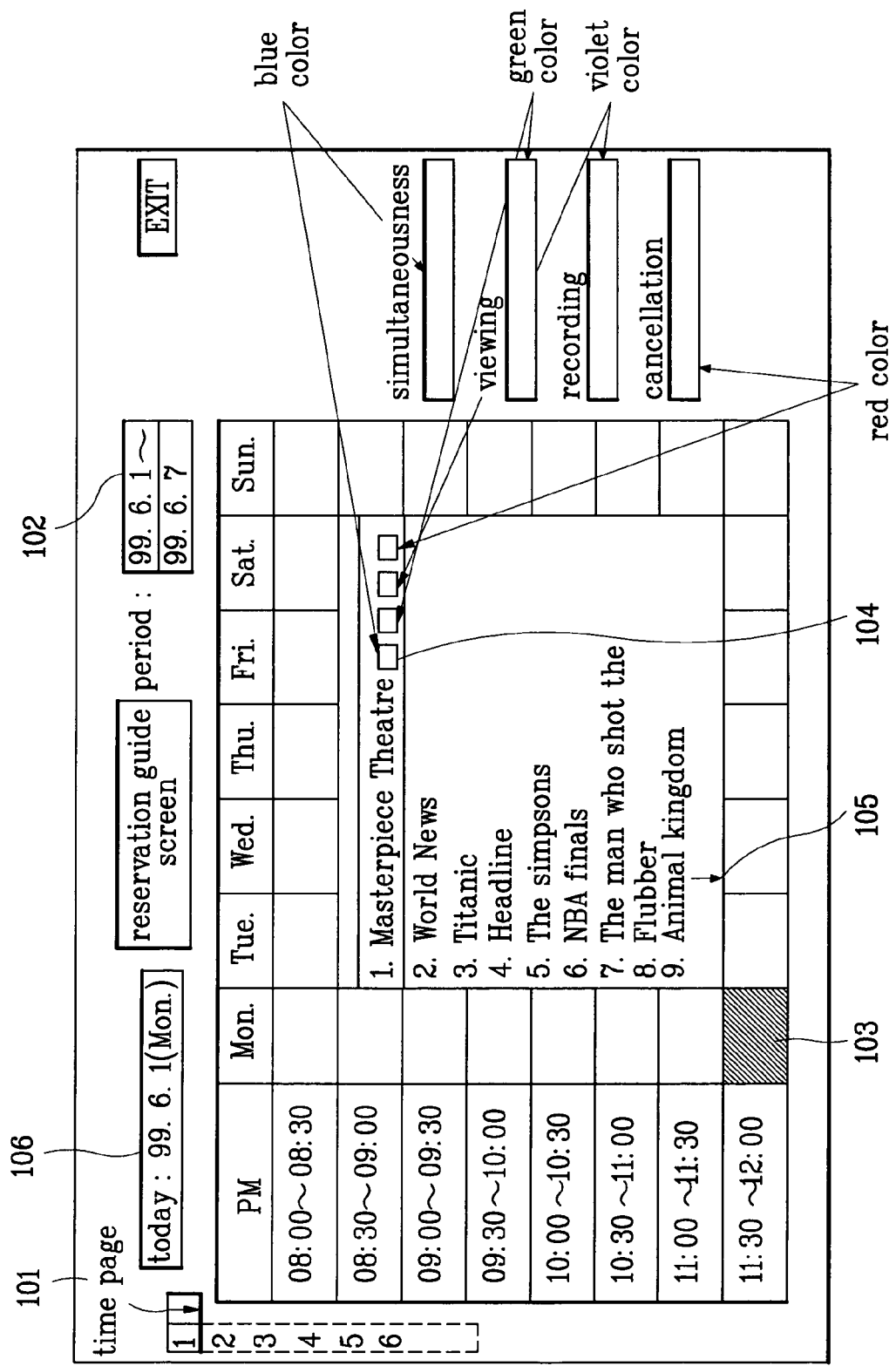
FIG. 5 shows a reservation guide screen in the tv according to the present invention.
Figure 6:
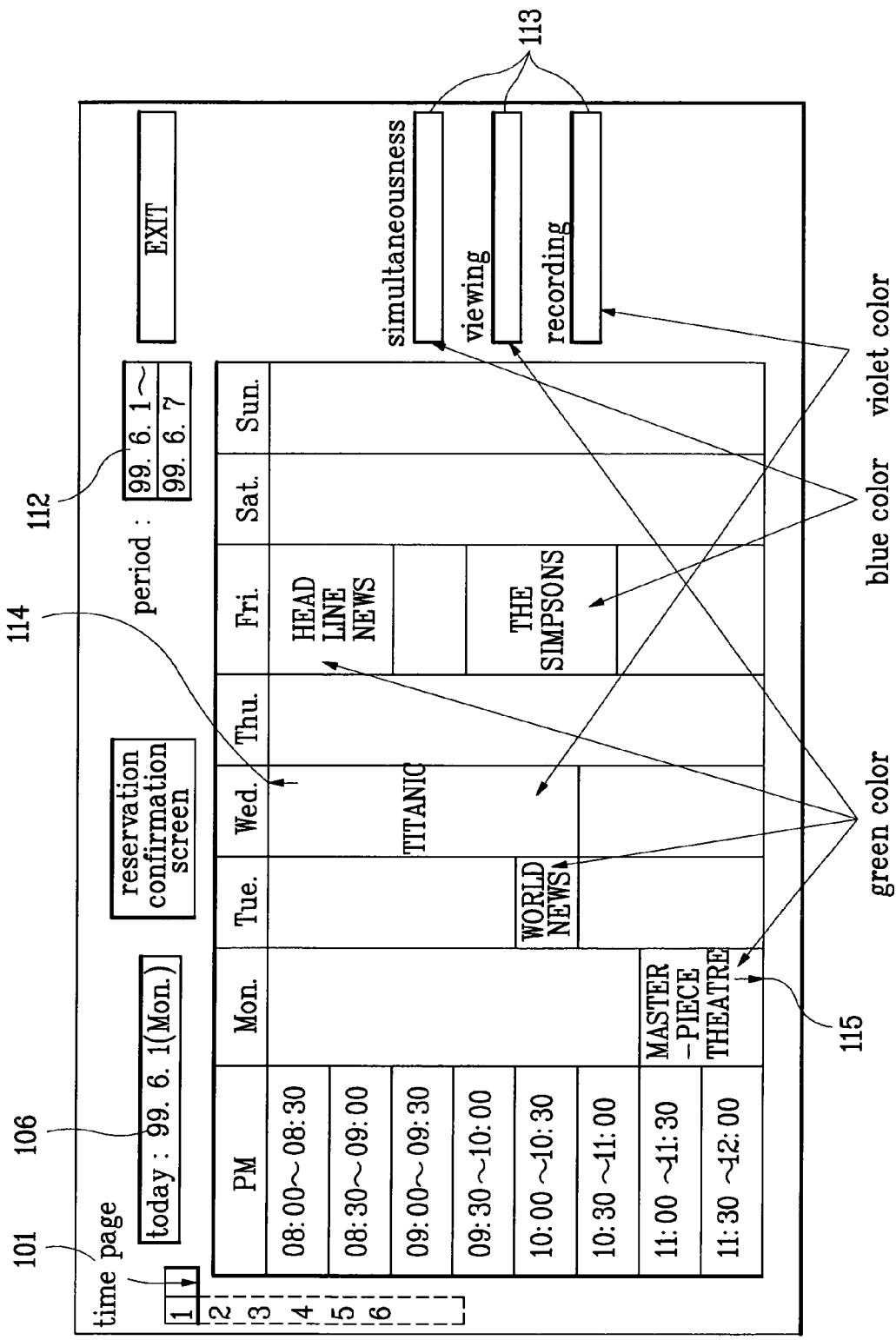
FIG. 6 shows a reservation confirmation screen in the tv according to the present invention.

As shown in FIG. 5, a reservation guide screen of the tv according to the present invention includes a matrix screen based on a date axis in a horizontal direction and a temporal axis in a vertical direction when a user selects a reservation mode, a time page list 101 indicating time range including current time selected by the user, a reservation time display portion 102 for displaying reservation time set by the user, a time zone 103 for displaying the user's desired day and time, icons 104 for setting reservation state of the user's desired program, and an arrow 105 for displaying the presence of successive programs if all programs of a corresponding time zone are not displayed on one screen.

If the user selects a specific day and specific time, a program list is displayed on the center of the matrix screen. The icons 104 are simultaneously displayed on the program list to select reservation recording or reservation viewing of each program.

The icons 104 are consisted of four icons for reservation recording, reservation viewing, simultaneous selection of reservation recording and reservation viewing, and cancellation. The user can select a desired mode by selecting a desired icon from the icons 104 displayed on the respective program list.

The time page list 101 divides 24 hours into 6 to display the time page numbers from 1 to 6, supposing that the user regards the time range as 4 hours. For example, if the user selects the page number 6, the timetable from 8:00, p.m. to midnight can be displayed so that the user can adjust the time zone corresponding to each page. That is to say, if the page number 1 is set from 0:00, a.m. to 4:00, a.m., the page number 2 is set from 4:00, a.m. to 8:00, a.m. In another case, if the page number 1 is set from 2:00, a.m. to 6:00, a.m., the next page number is automatically set from 6:00, a.m. to 10:00, a.m.

In the present invention, the reservation time display portion 102 displays the user's desired reservation time for the unit of week. Alternatively, a desired reservation time may be set at the user's option.

As described above, if the user desires to reserve a program at 11:30 on June 1 on the reservation guide screen, the user selects a column where date, June 1 in a horizontal axis crosses time 11:30 in a vertical axis. Then, the program list of all the channels to be broadcasted at 11:30 on June 1 is displayed on a sub screen at the center of the reservation guide screen.

At this time, the user moves a cursor to a desired channel program referring to the displayed program list and selects one of reservation recording, reservation viewing, simultaneous selection of reservation recording and reservation viewing, and cancellation, which are displayed simultaneously with the program list.

The user reaches a desired reservation program on the program list using up/down direction keys and selects the icon using left/right direction keys or a mouse.

After reservation viewing or reservation recording is set as above, the user enters a confirmation key. Then, as shown in FIG. 6, day is displayed on a horizontal axis, a time zone including time selected by the user is displayed on a vertical axis, and a program title corresponding to the day and time selected by the user is displayed. At this time, respective program titles are displayed by different colors so that the user can distinguish the program titles from one another in accordance with reservation viewing or reservation recording.

If the user sets "master-piece theater" starting from 11:00, p.m. on Monday, "world news" running between 10:00, p.m. and 10:30, p.m. on Tuesday, and "headline news" between 8:00, p.m. and 9:00, p.m. on Friday as reservation viewing programs, a column where a corresponding day crosses a corresponding time is displayed by green color.

Furthermore, if "titanic" running to 10:30, p.m. on Wednesday is set for reservation recording, a corresponding column is displayed by violet color. If "Simpson" running between 10:00, p.m. and 11:00, p.m. on Friday is set for reservation viewing and reservation recording, a corresponding column is displayed by blue color.

The user can set a reference date of a currently viewing reservation confirmation screen by displaying date of today on a left top of the reservation confirmation screen.

Figure 7:
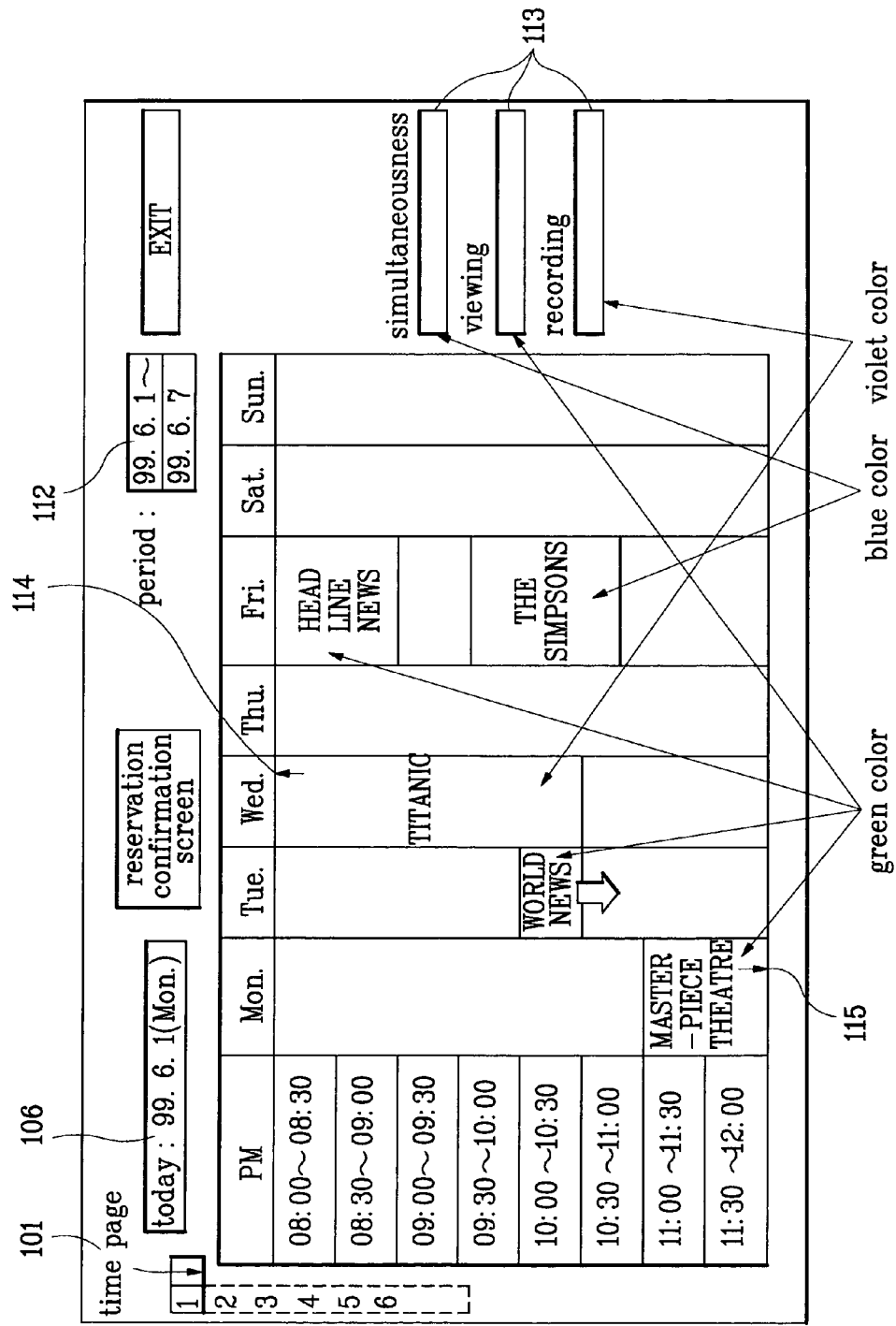
FIG. 7 shows an embodiment of the tv according to the present invention.

If the consecutive recording program selected by the user exists on the reservation confirmation screen displayed in a timetable, an arrow 116 indicating whether to perform consecutive recording is displayed on a lower portion of a corresponding program, as shown in FIG. 7.

In other words, if the user desires to select "world news" running from 10:00, p.m. to 10:30, p.m. on Tuesday as a reservation viewing program everyday from June 1 to June 7, an arrow 116 is displayed on the lower portion of the program "world news".

As aforementioned, a method for displaying a reservation guide/confirmation screen in a tv has the following advantages.

In the reservation mode, day or date is displayed on a horizontal axis and a user's desired time zone is displayed on a vertical axis in a two-dimensional timetable. Therefore, the user can easily recognize a reservation guide/confirmation screen. Furthermore, since reservation can be set and confirmed on the screen of two-dimensional timetable type using a mouse or key, convenience can be provided to the user.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for displaying a reservation guide/confirmation screen in a television, comprising:
   displaying a reservation guide screen;
   setting a user's desired reservation state using a predetermined key on the reservation guide screen; and
   displaying a reservation confirmation screen upon selection of a reservation confirmation mode in a two dimensional grid, a first dimension representing a plurality of days and a second dimension representing times of a day, wherein said displaying of the reservation guide screen and said reservation confirmation screen comprise predetermined programming by television broadcasting corresponding to said plurality of days and times of a day, and wherein said displaying the reservation confirmation screen includes displaying a reservation state of a first program by a background color of a first portion where a first program title is displayed and displaying a reservation state of a second program by a background color of a second portion where a second program title is displayed, the background color of the first portion and the background color of the second portion each being a separate one of a plurality of colors set in accordance with a selection of one of the group of reservation viewing, reservation recording and simultaneous selection of the reservation viewing and the reservation recording.

2. The method of claim 1, wherein displaying the reservation guide screen further comprising displaying a date selected by the user on a horizontal axis and displaying a time on a vertical axis at a certain interval.

3. The method of claim 1, wherein setting the user's desired reservation state further comprises selecting a desired date and a desired time from a two dimensional grid having dates on a first axis and times on a second axis using the predetermined key, displaying a program list corresponding to the selected date and time, selecting a desired program from the program list, and setting whether to perform reservation recording or reservation viewing on the program list.

4. The method of claim 3, wherein displaying the program list further comprises simultaneously displaying a plurality of icons for selecting at least one of each channel number corresponding to the date and time zone selected by the user, a broadcasting station name, a program title, and reservation recording or reservation viewing of each channel.

5. The method of claim 4, wherein displaying the program list further comprises displaying at least one of a channel number corresponding to the date and time selected by the user, a broadcasting station name, and a program title on a sub screen at a prescribed location of the reservation guide screen.

6. The method of claim 3, wherein the predetermined key comprises at least one of up/down keys and left/right keys.

7. The method of claim 3, wherein setting the reservation recording or reservation viewing state further comprises moving a cursor to the user's desired program on the program list using the predetermined key, and selecting the reservation recording or reservation viewing state on the user's desired program using the predetermined key.

8. The method of claim 1, wherein displaying the reservation confirmation screen comprises displaying a day on a horizontal axis, displaying a time zone on a vertical axis at a prescribed interval, and displaying the reservation state of the first program selected by the user at the day and corresponding time selected by the user in a timetable type.

9. The method of claim 8, wherein displaying the reservation state of the program selected by the user comprises the displaying a set state of the reservation recording or reservation viewing program selected by the user on a portion where the corresponding day crosses the corresponding time zone.

10. The method of claim 8, wherein displaying the reservation confirmation screen further comprises displaying a consecutive reservation indicator on a prescribed portion of the corresponding selected program, said consecutive reservation indicator indicating that the user has previously selected the consecutive reservation on the reservation confirmation screen.

11. The method of claim 10, wherein displaying the consecutive recording indicator further comprises displaying a separate symbol on a lower portion of the portion where the separate symbol crosses into a different time zone.

12. The method of claim 1, wherein the reservation confirmation screen indicates blocks of time on prescribed dates during which a reservation event is scheduled.

13. The method of claim 2, further comprising displaying a currently selected date and currently selected time on a prescribed portion of the screen.

14. The method of claim 3, wherein setting further comprise selecting a cancel option.

15. The method of claim 6, wherein setting the reservation recording or reservation viewing state further comprise moving a cursor to the user's desired program on the program list using the up/down keys, and selecting the reservation recording or reservation viewing state on the user's desired program using the left/right keys.

16. A method of displaying a reservation confirmation screen for a multimedia device, comprising:
  forming a reservation confirmation screen having a first axis representing time of day, a second axis representing a plurality of days, and a channel guide which includes predetermined television programming;
  selecting days, times and predetermined television programming from the reservation confirmation screen;
  programming a television tuner to tune into predetermined television programming based on the selection of days, times and predetermined television programming;
  displaying a first reservation state of the predetermined television programming on the reservation confirmation screen by displaying a first background color at a position corresponding to a day of a first event and a time of the first event, wherein the time begins at a starting time of the first event and ends at a completion time of the first event; and
  displaying a second reservation state of the predetermined television programming on the reservation confirmation screen by displaying a second background color at a position corresponding to a day of a second event and a time of the second event;
  wherein the first background color and the second background color are separate ones of a plurality of colors set in accordance with a selection of one of the group of reservation viewing, reservation recording, and simultaneous selection of the reservation viewing and the reservation recording.

17. The method of claim 16, further comprising displaying a third reservation state of the predetermined television programming on the reservation confirmation screen by displaying a third background color at a position corresponding to a day of a third event and a time of the third event.

18. The method of claim 16, wherein displaying events from the list of events includes displaying a consecutive reservation indicator on a prescribed portion of the corresponding selected program, said consecutive reservation indicator indicating that the user has previously selected the consecutive reservation on the reservation confirmation screen.

19. The method of claim 18, wherein displaying the consecutive recording indicator further comprises displaying a separate symbol on a lower portion of the portion where the separate symbol crosses into a different time zone.

20. A method of displaying a reservation confirmation screen for a multimedia device, comprising:
  forming a grid display of a reservation confirmation screen having a first axis representing time of day and a second axis representing a plurality of days;
  determining a list of events to be displayed on the grid display according to a user's selection of events from a channel guide, wherein the event is a television program; and
  displaying events from the list of events on the grid display at a position corresponding to a day of the event and a time of the event, wherein the time begins at a starting time of the event and ends at a completion time of the event, wherein a first background color of the event display indicates one of the group of reservation viewing, reservation recording and simultaneous selection of the reservation viewing and the reservation recording, and a second background color of the event display indicates another one of the group of reservation viewing, reservation recording and simultaneous selection of the reservation viewing and the reservation recording.

21. The method of claim 20, wherein a third background color of the event display indicates another one of the group of reservation viewing, reservation recording and simultaneous selection of the reservation viewing and the reservation recording.

22. The method of claim 20, wherein displaying events from the list of events includes displaying a consecutive reservation indicator on a prescribed portion of the corresponding selected program, said consecutive reservation indicator indicating that the user has previously selected the consecutive reservation on the reservation confirmation screen.

23. A method for displaying a reservation confirmation screen for a multimedia device, comprising:
  forming a grid display of a reservation confirmation screen having a first axis representing time of day and a second axis representing a plurality of days;
  determining a list of events to be displayed on the grid display according to a user's selection of events from a channel guide; and
  displaying events from a list of events on the grid display at a position corresponding to a day of the event and a time of the event, wherein the time of the event begins at a starting time of the event and ends at a completion time of the event, and displaying a consecutive reservation indicator on a prescribed portion of the corresponding selected event, said consecutive reservation indicator indicating that the user has previously selected a consecutive reservation on the reservation confirmation screen, wherein a first background color of the grid display indicates one of the group of reservation viewing, reservation recording and simultaneous selection of the reservation viewing and the reservation recording, and a second background color of the grid display indicates another one of the group of reservation viewing, reservation recording and simultaneous selection of the reservation viewing and the reservation recording.

24. The method of claim 23, wherein displaying the consecutive reservation indicator further comprises displaying a separate symbol on a lower portion of the portion where the separate symbol crosses into a different time zone.

25. A method for displaying a reservation confirmation screen for a multimedia device, comprising:

forming a reservation confirmation screen having a first axis representing time of day, a second axis representing a plurality of days, and a channel guide which includes predetermined television programming;

selecting days, time and predetermined television programming from the reservation confirmation screen;

programming a television tuner to tune into predetermined television programming based on the selection of days, times and predetermined television programming;

displaying reservation states of the predetermined television programming on the reservation confirmation screen; and displaying a consecutive reservation indicator on a prescribed portion of a selected program, said consecutive reservation indicator indicating that a user has previously selected a consecutive reservation on the reservation confirmation screen, wherein displaying reservation states of the predetermined television programming comprises:

displaying a first reservation state of the predetermined television programming on the reservation confirmation screen by displaying a first background color at a position corresponding to a day of a first event and a time of the first event, wherein the time begins at the starting time of the first event and ends at a completion time of the first event;

displaying a second reservation state of the predetermined television programming on the reservation confirmation screen by displaying a second background color at a position corresponding to a day of a second event and a time of the second event;

wherein the first background color and the second background color are separate ones of a plurality of colors set in accordance with a selection of one of the group of reservation viewing, reservation recordings, and simultaneous selection of the reservation viewing and the a reservation recording.

26. The method of claim 25, wherein displaying the consecutive reservation indicator further comprises displaying a separate symbol on a lower portion of the portion wherein the separate symbol crosses into a different time zone.

* * * * *